United States Patent Office 2,914,561
Patented Nov. 24, 1959

2,914,561

AMINE DERIVATIVES OF TRIPHENYLETHYLENE

Robert E. Allen, Wyoming, and Frank P. Palopoli and Edward L. Schumann, Cincinnati, Ohio, and Marcus G. Van Campen, Jr., Berkeley, Calif., assignors to The Wm. S. Merrell Company No Drawing. Application August 6, 1957
Serial No. 676,477

6 Claims. (Cl. 260—570)

Our invention relates to new chemical compounds which may be regarded as derivatives of triphenylethylene. They are distinguished, in general, by their anti-estrogenic activity in the endocrine system, anti-inflammatory activity and gonadotrophic activity. Some of the compounds possess various combinations of these properties.

As estrogen antagonists, the compounds are useful in the treatment of hyperestrogenism and disorders related to this condition, e.g., endometriosis, Kleinfelter's syndrome, dysmenorrhea, menopausal disfunction, functional bleeding and similar conditions. They are active both orally and parenterally and so can be administered by either route, though the oral route is preferred in most instances. Some of the compounds have a high degree of activity as estrogen antagonists and are advantageously non-estrogenic. Some of the compounds with anti-estrogenic activity are also uterotrophic.

As anti-inflammatory agents, the compounds are useful in alleviating the symptoms of such collagen diseases as arthritis and rheumatism and in the topical treatment of inflammation. Some of the compounds possess the novel combination of anti-inflammatory and anti-estrogenic activities and are especially advantageous for this reason.

As gonadotrophic inhibition agents, the compounds are useful for the treatment of fertility and sterility problems and can be administered orally or parenterally for this purpose.

The compounds can be used orally or parenterally in doses ranging between 25 mg. and 2–4 grams daily, depending on the condition under treatment. For topical use, the compounds can be incorporated into creams, ointments or lotions in concentrations of up to 10 percent. In aerosol sprays, the concentration can be in the order of about 0.05 to 1 percent.

The ethylenes can be isolated and are generally useful in the form of their salts with mineral acids such as hydrochloric or hydrobromic acid or with organic acids such as citric, oxalic or the like. They can be used as the base, however.

The compounds of our invention are derivatives of triphenyl ethylenes in which one of the phenyl groups is substituted by a basic ether group of the formula described below and in which the mono-phenyl substituted carbon atom in the ethylene group is linked to hydrogen. The new compounds have the formula

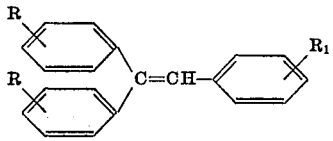

in which one of the groups represented by R is a basic ether group of the formula —OC$_n$H$_{2n}$A, wherein $n$ is 2, 3 or 4 and A is an amino group or an alkylamino, dialkylamino or di(haloalkyl)amino group in which the alkyl groups contain from 1 to 4 carbon atoms. The group —OC$_n$H$_{2n}$A is attached to the benzene ring by the oxygen atom in the meta or para position to the point of attachment of the benzene ring to the ethylene group. The benzene nucleus substituted with the —OC$_n$H$_{2n}$A group must be attached to a carbon atom bearing a second benzene nucleus. The remaining R group and the R$_1$ group are hydrogen, halogen, methyl or methoxy provided, however, that at least one of the said groups is halogen, methyl or methoxy.

The new ethylenes can be generally prepared by dehydration of the corresponding ethanols of the formula

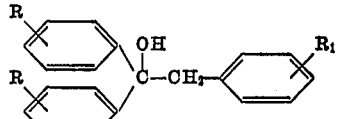

wherein the R and R$_1$ substituents have the same meaning described above, except that A is not a di(haloalkyl)-amino group. The dehydration is carried out by using mineral acids such as hydrochloric, hydrobromic or phosphoric acid. The ethanols from which the ethylenes are prepared are described in our applications Serial No. 599,343, filed July 23, 1956, and now abandoned, and Serial No. 676,478, filed August 6, 1957.

The ethylenes in which A is a di(haloalkyl)amino group can be prepared by reacting an alkali metal salt of a hydroxybenzophenone with an alkyl halide such as ethylene chlorobromide to obtain a haloalkoxy benzophenone and reacting this compound with a benzylmagnesium bromide or chloride followed by dehydration followed by reaction with a dialkanolamine followed by reaction with a thionyl halide.

The compounds of our invention will be further illustrated by reference to the following examples.

Example 1

*1 - [p - (β - methylaminoethoxy)phenyl] - 1 - phenyl-2-p-anisylethylene.*—A mixture of 20 grams of 1-[p-(β-methylaminoethoxy)phenyl] - 1 - phenyl - 2 - p - anisylethanol in 200 cc. of ethanol containing an excess of hydrogen chloride was refluxed three hours. The solvent and excess HCl were removed under vacuum and the residue was dissolved in ethyl acetate and methanol. Crystallizing the product from methanol-ethyl acetate gave the hydrochloride salt of 1-[p-(β-methylaminoethoxy)phenyl]-1-phenyl-2-p-anisylethylene, melting at 201° C.

This compound exhibits uterotrophic estrogen antagonist, gonadotrophic inhibitory and anti-inflammatory activities.

Example 2

*1 - [p - (β - aminoethoxy)phenyl] - 1 - phenyl - 2 - p-anisylethylene.*—A solution of β-dibenzylaminoethyl chloride in 200 ml. of toluene (prepared from 100 grams of the HCl salt and excess potassium hydroxide solution) was added to a mixture of 67 grams of 4-hydroxybenzophenone and 19 grams of sodium methoxide in 300 ml. of ethanol during stirring and refluxing. After a period of 6 hours of refluxing, the solvent was removed, and an ether extract of the residue was washed with an excess of 10% sodium hydroxide solution and then water. The ether layer was then concentrated on the steam bath, and crystals of 4-(β-dibenzylamino)-ethoxybenzophenone were obtained, melting at 101–102° C. This ketone (87 grams) was suspended in 400 ml. of dry ether, and 500 ml. of an ether solution containing 0.20 moles of p-methoxybenzylmagnesium chloride was added, and the mixture was stirred for 3 hours. An excess of 10% ammonium chloride solution was added with stirring. The ether layer was separated and concentrated on the steam bath. The oily residue was dissolved in 500 ml. of ethanol and added to 12 grams of palladium on charcoal catalyst; the mixture was then hydrogenated at about 3 atmospheres pressure until about 2 mole equivalents of hydrogen is absorbed. The mixture was filtered, the filtrate concentrated on the steam bath, and ether added to the oily residue. Crystals of 1-[p-(β-aminoethoxy)phenyl]-1-phenyl-2-p-anisylethanol were obtained, melting at 131.5°–132.5° C.

1 - [p - (β-aminoethoxy)phenyl] - 1 - phenyl - 2 - p-anisylethanol was dehydrated by mixing it with 100 ml. of ethanol containing an excess of hydrogen chloride and refluxing for three hours. The solvent was replaced with ether and an excess of 10 percent sodium hydroxide solution, extracting the basic ether into the ether. After washing with water and drying with anhydrous magnesium sulfate, the ether was replaced with ethanol and the free base in ethanol was treated with an alcoholic solution of oxalic acid. The oxalate salt of 1-[p-(β-aminoethoxy)-phenyl]-1-phenyl-2-p-anisylethylene was obtained, melting at 183° C. with decomposition.

This compound exhibits weakly estrogenic uterotrophic estrogen antagonist, gonadotrophic inhibitory and anti-inflammatory activities.

Example 3

*1 - [p - (β - dimethylaminoethoxy)phenyl] - 1 - phenyl-2 - p - anisylethylene.*—When 1 - [p - (β - dimethylamino-ethoxy)phenyl]-1-phenyl-2-p-anisylethanol was heated two hours on the steam bath in an excess of 10 percent hydrochloric acid, an oil was obtained which, after crystallizing first from isopropanol and then from acetone, gave the hydrochloride salt of 1-[p-(β-dimethylaminoethoxy)phenyl] - 1 - phenyl - 2 - p - anisylethylene melting at 143°–163° C.

This compound exhibits estrogenic estrogen antagonist, gonadotrophic inhibitory and anti-inflammatory activities.

Example 4

*1 - [p - (β - diethylaminoethoxy)phenyl] - 1 - phenyl-2 - p - anisylethylene.*—When 1 - [p - (β - diethylamino-ethoxy)phenyl] - 1 - phenyl - 2 - p - anisylethanol was dehydrated according to Example 2 and treated with citric acid in butanone, the dihydrogen citrate salt of 1-[p-(β-diethylaminoethoxy)phenyl] - 1 - phenyl - 2 - p - anisylethylene was obtained, melting at 110° C. with decomposition.

This compound exhibits non-estrogenic uterotrophic estrogen antagonist, gonadotrophic inhibitory and anti-inflammatory activities.

Example 5

*1 - [m - (β - diethylaminoethoxy)phenyl] - 1 - phenyl-2-p-anisylethylene.*—Thirty grams of the dihydrogen citrate salt of 1-[m-(β-diethylaminoethoxy)phenyl]-1-phenyl-2-p-anisylethanol was converted to the free base with 10 percent sodium hydroxide and was then treated with alcoholic hydrogen chloride as in Example 2. The solvent was removed and the residue was taken up in dry benzene and diluted with ether. After standing several days, crystals of 1-[m-(β-diethylaminoethoxy)phenyl]-1-phenyl-2-p-anisylethylene hydrochloride were obtained, melting at 157°–162° C.

The compound exhibits estrogenic estrogen antagonist and anti-inflammatory activities.

Example 6

*1 - [p - (β - diethylaminoethoxy)phenyl] - 1 - phenyl-2 - p - chlorophenylethylene.*—After refluxing 1 - [p-(β - diethylaminoethoxy)phenyl] - 1 - phenyl - 2 - p-chlorophenylethanol in alcoholic hydrogen chloride as in Example 1, the product was crystallized from isopropanol to give the hydrochloride salt of 1-[p-(β-diethylamino-ethoxy)phenyl] - 1 - phenyl - 2 - p - chlorophenylethylene, melting at 196°–197° C.

This compound exhibits uterotrophic estrogen antagonist and anti-inflammatory activities.

Example 7

*1 - [p - (β - diethylaminoethoxy)phenyl] - 1 - p-chlorophenyl - 2 - phenylethylene.*—When 1 - [p - (β - diethylaminoethoxy)phenyl] - 1 - p - chlorophenyl - 2-phenylethanol was dehydrated and treated with citric acid as in Example 4, the dihydrogen citrate salt of 1 - [p - (β-diethylaminoethoxy)phenyl] - 1 - p - chlorophenyl - 2-phenylethylene was obtained, melting at 127° C. with decomposition.

This compound exhibits non-estrogenic uterotrophic estrogen antagonist, gonadotrophic inhibitory and anti-inflammatory (dextran edema) activities.

Example 8

*1 - [p - (β - diethylaminoethoxy)phenyl] - 1 - p-chlorophenyl - 2 - p - anisylethylene.*—When 1 - [p - (β-diethylaminoethoxy)phenyl] - 1 - p - chlorophenyl - 2 - p-anisylethanol was dehydrated and treated with citric acid, as in Example 4, the dihydrogen citrate salt of 1-[p-(β-diethylaminoethoxy)phenyl] - 1 - p - chlorophenyl - 2 - p-anisylethylene was obtained, decomposing at 143° C.

This compound exhibits uterotrophic and anti-inflammatory activities.

Example 9

*1 - [p - (β - diethylaminoethoxy)phenyl] - 1,2 - di - p-chlorophenylethylene.*—After dehydrating 1 - [p - (β - diethylaminoethoxy)phenyl] - 1,2 - di - p - chlorophenyl-ethanol and treating the product with citric acid as in Example 4, the dihydrogen citrate salt of 1-[p-(β-diethyl-aminoethoxy)phenyl] - 1,2 - di - p - chlorophenylethylene was obtained, melting at 176°–178° C.

This compound exhibits uterotrophic and anti-inflammatory activities.

Example 10

*1 - [p - (β - diethylaminoethoxy)phenyl] - 1 - p - tolyl-2-p-anisylethylene.*—Following the procedure of Example 4, 1 - [p - (β - diethylaminoethoxy)phenyl] - 1 - p - tolyl-2-p-anisylethanol was dehydrated and the dihydrogen citrate salt of 1-[p-(β-diethylaminoethoxy)phenyl]-1-p-tolyl-2-p-anisylethylene was obtained, decomposing at 118°–121° C.

This compound exhibits estrogenic estrogen antagonist and anti-inflammatory activities.

Example 11

*1 - [p - (β-diethylaminoethoxy)phenyl]-1-p-tolyl-2-p-chlorophenylethylene.*—The dehydration of 1-[p-(β-di-ethylaminoethoxy) - phenyl]-1-p-tolyl-2-p-chlorophenyl-ethanol as in Example 4 gave a product which was treated with citric acid to give the dihydrogen citrate salt of 1 - [p - (β - diethylaminoethoxy)phenyl]-1-p-tolyl-2-p-chlorophenylethylene, decomposing at 115°–118° C.

This compound exhibits anti-inflammatory activity.

Example 12

*1 - [p-(β-dimethylaminoisopropoxy)phenyl]-1-phenyl-2 - p-anisylethylene.*—After treating 1-[p-(β-dimethyl-aminoisopropoxy) - phenyl] - 1-phenyl-2-p-anisylethanol with alcoholic hydrogen chloride, converting the product to the free base and treating with citric acid as in Example 4, the dihydrogen citrate salt of 1-[p-(β-dimethyl-aminoisopropoxy)phenyl] - 1 - phenyl-2-p-anisylethylene was obtained, melting at 96°–97° C.

This compound exhibits estrogenic estrogen antagonist, gonadotrophic inhibitory and anti-inflammatory activities.

Example 13

*1 - [p - (β-diethylaminobutoxy)phenyl]-1-phenyl-2-p-anisylethylene.*—When 1 - [p - (β-diethylaminobutoxy)

phenyl]-1-phenyl-2-p-anisylethanol was dehydrated with alcoholic hydrogen chloride and then treated with citric acid as in Example 4, the dihydrogen citrate salt of 1-[p-(β - diethylaminobutoxy)phenyl] - 1-phenyl-2-p-anisylethylene was obtained, melting at 95°–98° C.

This compound exhibits estrogenic estrogen antagonist, gonadotrophic inhibitory and anti-inflammatory activities.

Example 14

*1-[p - (β - di-n-butylaminoethoxy)phenyl]-1-phenyl-2-p-anisylethylene.*—When 1 - [p-(β-di-n-butylaminoethoxy)phenyl]-1-phenyl-2-p-anisylethanol was treated with alcoholic hydrogen chloride as in Example 1, the oily product was crystallized from dry benzene and ether. After recrystallizing from butanone and ether, the hydrochloride salt of 1-[p-(β-di-n-butylaminoethoxy)phenyl]-1-phenyl-2-p-anisylethylene was obtained, melting at 167°–172° C.

This compound exhibits weakly estrogenic estrogen antagonist activity.

Example 15

*1 - [p - (β-diethylaminoethoxy)phenyl]-1-phenyl-2-p-tolylethylene.*—When 1 - [p - (β-diethylaminoethoxy)phenyl]-1-phenyl-2-p-tolylethanol is dehydrated with alcoholic hydrogen chloride as in Example 1, the product was crystallized from ethyl acetate to give the hydrochloride salt of 1-[p-(β-diethylaminoethoxy)phenyl]-1-phenyl-2-p-tolylethylene, melting at 163°–171° C.

This compound exhibits uterotrophic estrogen antagonist, gonadotrophic inhibitory and anti-inflammatory activities.

Example 16

*1 - [p - (β - diethylaminoethoxy)phenyl]-1-p-tolyl-2-phenylethylene.*—When 1 - [p-(β-diethylaminoethoxy)phenyl]-1-p-tolyl-2-phenylethanol was dehydrated with alcoholic hydrogen chloride and the product treated with citric acid as in Example 4, the dihydrogen citrate salt of 1-[p-(β-diethylaminoethoxy)phenyl]-1-p-tolyl-2-phenylethylene was obtained, melting at 122°–124° C.

This compound exhibits non-estrogenic uterotrophic and anti-inflammatory activities.

Example 17

*1 - [p - (β-dimethylaminoethoxy)phenyl]-1-phenyl-2-p-bromophenylethylene.*—After refluxing a solution of 1-[p-(β-dimethylaminoethoxy)phenyl]-1-phenyl - 2 - p - bromophenylethanol in alcoholic hydrogen chloride as in Example 1, the product was crystallized from ethyl acetate to give the hydrochloride salt of 1-[p-(β-dimethylaminoethoxy)phenyl] - 1 - phenyl-2-p-bromophenylethylene, melting at 198°–199° C.

This compound exhibits weakly estrogenic uterotrophic, gonadotrophic inhibitory and anti-inflammatory activities.

Example 18

*1 - [p - (β - (β,β'-bis[chloroethyl]amino)ethoxy)phenyl]-1-phenyl-2-p-anisylethylene.*—To a mixture of 198 g. of 4-hydroxybenzophenone and 54 g. sodium methoxide in 500 cc. of ethanol was added 572 g. of ethylene chlorobromide. The mixture was refluxed 4 hours, the ethanol was replaced with ether and the solution washed with 10% sodium hydroxide, dried over anhydrous magnesium sulfate and when the volume was reduced, 4 - (β-chloroethoxy)benzophenone separated, melting at 77°–78° C. To a solution of 122 g. of this ketone in 300 cc. dry benzene was added 1350 cc. of an ethereal solution containing 0.5 mole of p-methoxybenzylmagnesium chloride. The mixture was stirred for 2 hours, decomposed with 10% hydrochloric acid, the solvent was removed and the oily residue was refluxed in alcoholic hydrogen chloride for 3 hours. The oily product, after removing the alcohol and hydrochloride, was refluxed in 200 cc. isoamyl alcohol containing 78 g. of diethanolamine for 24 hours. After removing the isoamyl alcohol, the residue was shaken with ether and 10% sodium hydroxide, the ether solution was washed with water, extracted with 10% hydrochloric acid, the aqueous layer was made alkaline and extracted with ether.

The oily residue (150 g.) was dissolved in 500 cc. dry benzene and 90 g. of thionyl chloride was added slowly with cooling. After stirring 3 hours, the benzene and excess $SOCl_2$ were removed, the residue was taken up in methylene chloride and diluted with ether to give a solid product. Three crystallizations from dry benzene gave 1 - [p - (β - (β,β' - bis[chloroethyl]amino)ethoxy)phenyl]-1-phenyl-2-p-anisylethylene as the hydrochloride, melting at 140° C., with decomposition.

This compound exhibits weakly estrogenic uterotrophic, gonadotrophic inhibitory and anti-inflammatory activities.

Example 19

*1 - [p - (β-diethylaminoethoxy)phenyl]-1-phenyl-2-p-fluorophenylethylene.*—When 1-[p - (β-diethylaminoethoxy)phenyl]-1-phenyl-2-p-fluorophenylethanol was dehydrated according to Example 2 and treated with citric acid in butanone, the dihydrogen citrate salt of 1-[p-(β-diethylaminoethoxy)phenyl] - 1-phenyl-2-p-fluorophenylethylene was obtained, melting at 127° C. with decomposition.

This compound exhibits anti-inflammatory activity.

All of the compounds of the above examples exhibited the activities described for each when administered parenterally (subcutaneously). Also, the compound of Example 4 exhibited estrogen antagonist activity when administered orally. Also, the compounds of Examples 3, 6 and 16 exhibited anti-inflammatory activity when administered orally.

The following examples illustrate suitable pharmaceutical compositions containing the new compounds. In these examples, the quantities are given for single units, it being understood that in actual practice, the dosage forms will be prepared in suitable quantities, and the amounts of the materials adjusted accordingly.

Example 20

*25 mg. tablets.*—Twenty-five mg. of the citrate of 1-[p-(β-diethylaminoethoxy)phenyl]-1 - phenyl - 2 - p - anisylethylene (Example 4), 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a %2 inch punch.

Example 21

*500 mg. tablets.*—Five hundred mg. of the citrate of 1-[p-(β-diethylaminoethoxy)phenyl]-1-phenyl-2-p-anisylethylene (Example 4) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary using a 7/16 inch punch.

The tablets of Example 20 and Example 21 may be suitably coated if desired, as, for example, with sugar.

Example 22

*Capsule.*—Twenty-five mg. of the citrate of 1-[p-(β-diethylaminoethoxy)phenyl]-1-phenyl-2-p -anisylethylene (Example 4) is admixed with corn starch in quantity required to provide sufficient bulk for the desired size capsule, and the mixture is encapsulated.

Example 23

*Capsule.*—Five hundred mg. of the citrate of 1-[p-(β- diethylaminoethoxy)phenyl]-1-phenyl-2-p-anisylethylene (Example 4) is admixed with sufficient corn starch to give the proper bulk for the desired size capsule, and the mixture is encapsulated.

Example 24

*Injectible suspension, 100 mg. per ml.*—The following ingredients are sterilized separately: 100 mg. of the citrate of 1-[p-(β-diethylaminoethoxy)phenyl]-1-phenyl-2-p-anisylethylene (Example 4), 0.1 mg. of Tween 80 and q.s. corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

Example 25

*Oral suspension, 700 mg. per 15 ml.*—One hundred fifty mg. of Veegum H.V. are hydrated in about 9 ml. of water; 500 mg. of Tween 80, 700 mg. of the citrate of 1-[p-(β-diethylaminoethoxy)phenyl]-1-phenyl-2-p-anisylethylene (Example 4), color and flavor, as desired, and water q.s. 15 ml. are added; the product is mixed well and homogenized.

Example 26

*Liquid (syrup) 25 mg. per teaspoon.*—Twenty-five mg. of the citrate of 1-[p-(β-diethylaminoethoxy)phenyl]-1-phenyl-2-p-anisylethylene (Example 4) is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

Example 27

*Liquid (syrup) 500 mg. per tablespoon.*—Five hundred mg. of the citrate of 1-[p-(β-diethylaminoethoxy)phenyl]-1-phenyl-2-p-anisylethylene (Example 4) and 4.5 mg. of sugar are dissolved in sufficient water so that after the addition of 2.25 ml. of alcohol USP and flavor, as desired, the volume is 15 ml.

Example 28

*Injectable solution, 100 mg. per ml.*—One hundred mg. of the citrate of 1-[p-(β-diethylaminoethoxy)phenyl]-1-phenyl-2-p-anisylethylene (Example 4) and water for injection q.s. one ml. are mixed and warmed gently till solution is accomplished. The solution is filtered through an 03 porosity Selas filter, using sterilized equipment under aseptic conditions, and is used freshly made-up for injection.

Example 29

*1% ointment.*—To a melt of 1.5 lbs. of propylene glycol 6.68 lbs. of polyethylene glycol 400 USP and 6.68 lbs. of carbowax 4000 USP is added 0.15 lb. of micropulverized citrate of 1-[p-(β-diethylaminoethoxy)phenyl]-1-p-chlorophenyl-2-phenylethylene (Example 7). The product is stirred until almost solid and milled if necessary to a smooth ointment. Fill in suitable containers.

Example 30

*10% ointment.*—To a melt of 1.5 lbs. of propylene glycol, 6 lbs. of polyethylene glycol 400 USP and 6 lbs. carbowax 4000 USP is added 1.5 lbs. of micropulverized citrate of 1-[p-(β-diethylaminoethoxy)phenyl]-1-p-chlorophenyl-2-phenylethylene (Example 7). The product is stirred until almost solid and milled if necessary to a smooth ointment. Fill in suitable containers.

The other compounds of Examples 1 to 19 can also be used to prepare pharmaceutical preparations such as those of Examples 20 to 30.

This application is a continuation-in-part of our application, Serial No. 620,570, filed November 6, 1956, and now abandoned.

We claim:

1. Compounds of the formula

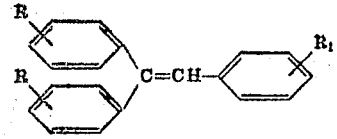

wherein one of the groups represented by R is a group of the formula $-OC_nH_{2n}A$, attached by the oxygen atom to the benzene ring in one of the positions meta and para to the point of attachment of the benzene ring to the carbon atom of the straight chain group, wherein $n$ is an integer of 2 to 4 and A is selected from the group consisting of amino, alkylamino in which the alkyl group contains from 1 to 4 carbon atoms, and dialkylamino in which the alkyl groups contain from 1 to 4 carbon atoms, and di(haloalkyl)amino in which the alkyl groups contain from 1 to 4 carbon atoms, wherein the remaining group represented by R and the $R_1$ group are selected from the group consisting of hydrogen, halogen, methyl and methoxy at least one of the said groups being selected from halogen, methyl and methoxy.

2. 1-[p-(β-diethylaminoethoxy)phenyl]-1-phenyl-2-p-anisylethylene.

3. 1-[p-(β-diethylaminoethoxy)phenyl]-1-phenyl-2-p-anisylethylene.

4. 1-[p-(β-diethylaminoethoxy)phenyl]-1-p-chlorophenyl-2-p-anisylethylene.

5. 1-[p-(β-diethylaminoethoxy)phenyl]-1,2-di-p-chlorophenylethylene.

6. 1-[p-(β-diethylaminoethoxy)phenyl]-1-p-tolyl-2-p-chlorophenylethylene.

References Cited in the file of this patent

UNITED STATES PATENTS

| 2,430,891 | Shelton et al. | Nov. 18, 1947 |
| 2,571,954 | Shelton et al. | Oct. 16, 1951 |
| 2,645,355 | Zweifel et al. | July 21, 1953 |

FOREIGN PATENTS

| 586,493 | Great Britain | Mar. 20, 1947 |
| 19,596 | Netherlands | Feb. 15, 1929 |

OTHER REFERENCES

Grundy: Chemical Reviews, vol. 57, pp. 351–401, No. 2, April 1957.